United States Patent Office.

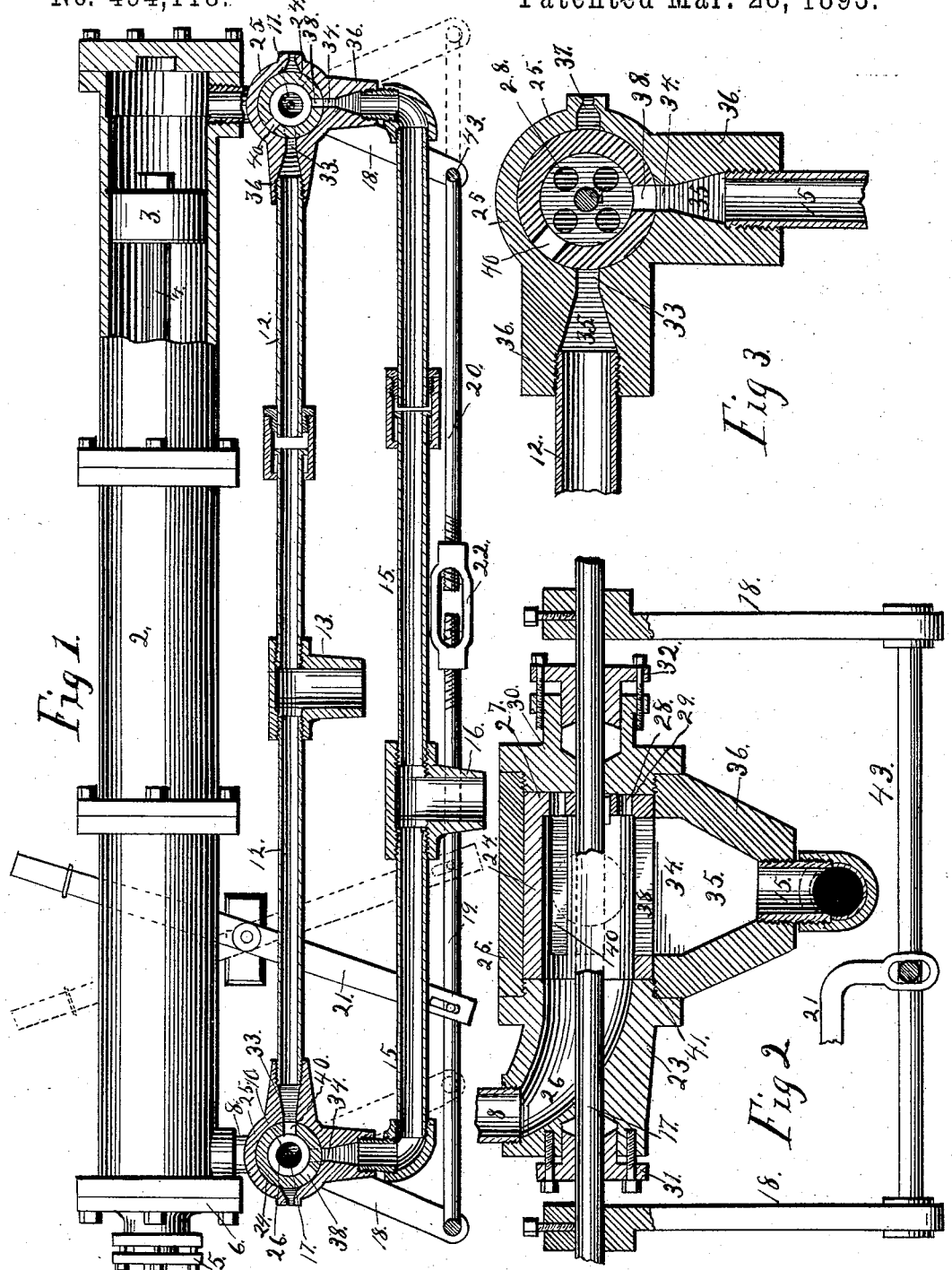

JAMES H. BROWN, OF EAU CLAIRE, WISCONSIN.

VALVE CONNECTION FOR STEAM SAWMILL-FEEDS.

SPECIFICATION forming part of Letters Patent No. 494,118, dated March 28, 1893.

Application filed February 27, 1892. Serial No. 422,954. (No model.)

*To all whom it may concern:*

Be it known that I, JAMES H. BROWN, residing at Eau Claire, in the county of Eau Claire and State of Wisconsin, have invented certain Improvements in Valves and Valve Connections for Steam Sawmill - Feeds, of which the following is a specification.

My invention relates particularly to rotary valves and connections therewith whereby steam may be introduced into, cut off, or exhausted from the ends of a long steam feed cylinder. These cylinders are sometimes thirty feet or more in length, the piston having a travel nearly equal to the length of the cylinder. The forward end of the piston is connected directly to the moving carriage carrying the head blocks by which the log is held and carried into the saw. Ordinarily the steam is supplied to the cylinder by means of a simple slide valve located on the exterior thereof and midway between the ends of the same. This arrangement is open to the objection that at the end of the stroke the pipe leading to the end of the cylinder often fifteen feet or more long is left full of steam thereby forming an elastic cushion for the piston head and making it impossible to stop the movement of the piston, and therewith the carriage, instantly, by shutting off the steam or by letting in live steam in front of the piston to stop its forward movement.

The object of my invention is primarily to make it possible to stop, reverse, or start the head block carriage instantly by the operation of a simple lever connected with the valves at the ends of the cylinder, and further to provide a valve especially adapted for the particular use described.

My invention consists in the combination with the long steam feed cylinder of steam-pipe connections with the ends thereof and a separate valve introduced in each pipe and in close proximity to the cylinder and means for operating said valves.

Further my invention consists in various constructions and in combinations hereinafter described and particularly pointed out in the claims.

My invention will be more readily understood by reference to the accompanying drawings in which:—

Figure 1 is a vertical, longitudinal section showing valves and valve connections embodying my invention. Fig. 2 is a vertical section of my valve on the line of the valve stem. Fig. 3 is a section thereof on the line $x$—$x$.

In the drawings, 2 represents the long steam feed cylinder, 3 the piston and 4 the piston rod. The piston rod passes through a suitable stuffing box 5 provided in the head 6. Short pipes 8 and 9 lead from the cylinder ports into the interior of the rotary valves 10 and 11 provided as close to the cylinder as convenient. These connections it is obvious may be made on the side or top of the cylinder, but the arrangement shown is preferable on account of ease of draining the same. The live steam enters the two valves through the pipes 12 extending from the T-coupling 13 forming an inlet thereto. The exhaust is formed by the pipes 15 leading from the valves into the outlet 16. The stems 17 are provided with crank arms 18 having their lower ends pivotally connected with the connection rods 19 and 20 adapted to be operated by a lever 21 to simultaneously open one valve and close the other. As shown the rods 19 and 20 are provided with threaded ends and are rigidly connected by a threaded turn buckle coupling 22 whereby the two rods may be drawn together or forced apart equal distances with respect to the turn buckle to adjust the distance between the ends of the valve crank rods or arms and therewith adjust the rotary valve sleeve in relation to the fixed ports in the valve casing.

The special form of the valve which I employ as particularly adapted for use with the other parts of the apparatus I have shown in detail in Figs. 2 and 3. The section of the valve shown in Fig. 1 may be said to be on the line $x$—$x$ in Fig. 2. Fig. 2 may be considered as an enlarged sectional view of the valve 10 the rotary sleeve 24 thereof having been moved to, open the outlet or exhaust ports. The rotary sleeve 24 of my valve fits tightly into the cylindrical valve casing 25 and has an open end concentric with the opening in the end of the valve casing leading into the conduit 26 in the neck which in turn opens the passage into the pipe 8. The other end 27 of the sleeve 24 is made solid with the exception of the central opening for the valve stem 17 and small openings 28 through which the steam is allowed to pass to the inner face of the valve casing or head 30 thereby in a measure "balancing" the valve. The valve stem 17 is keyed or otherwise secured in the end 27 of the rotary sleeve. Packing boxes 31 and 32 are provided about the stem 17 where it passes through the heads 23 and 30 screwed into the ends of the valve casing 25. Two permanent ports namely the steam inlet port 33 and the outlet or exhaust port 34 are provided in the valve casing, the same opening into the tapering chambers 35 in the projections 36 extending from the casing and into which the ends of the pipes 12 and 15 are screwed. An opening or slot 37 is preferably provided in the back of the casing 25 through which the atmospheric or steam pressure may be exerted to partially balance the valve. As shown the two ports 38 and 40 are provided in the rotary sleeve 24, the dimensions of the same corresponding to those of the inlet and outlet ports in the casing 25. These ports may be cut clear through to the end 41 of the sleeve if desired, but the construction shown is preferred. The arms 18 are secured on the ends of the valve stem 17 and are yoked together in any suitable manner as by the cross rod 43 so as to move rigidly together to prevent twisting of the valve stem and consequent disarrangement of the valve ports. The rods 19 and 20 extend from these cross bars 43. The shipper lever 21 is attached to the rods 19 and 20 in any suitable manner so that by movement of the same the rods may be reciprocated to control the passage or exhaust of steam into or from the cylinder 2. Suppose that steam has been entering the cylinder through the valve 10, the inlet port thereof being shown open, that the steam has forced the piston 3 back into the end of the cylinder 2, the steam passing from behind the piston into the interior of the valve and exhausting through the open exhaust ports leading into the pipe 15. At this instant the travel of the piston must be reversed and the lever 21 is thrown over into the position shown by dotted lines thereby opening the inlet port of the valve 11 and closing the exhaust thereof at the same time opening the exhaust of the valve 10 and closing the inlet of the same. It will be seen that a very little steam may be let into the cylinder by a slight movement of the lever to open the inlet port, or that steam may be entirely cut off from the same by an extreme movement of the lever 21 to close all of the ports of the valve. Further it will be seen that the movement of the piston 3 may be stopped or impeded by a sudden reversal or reversals of the shipper lever 21. Moreover the distance between the cylinder and the valve being very small the volume of steam within the short pipe connections does not form enough of a steam cushion to prevent sudden stoppage of the piston.

Having thus described my invention, I claim as new and desire to secure by Letters Patent—

1. The combination with the steam feed cylinder for saw-mills, of the live and exhaust steam connections with the ends of said cylinder, a rotary valve introduced therein close to each end of said cylinder, each of said valves made up of a casing 25 having the inlet and exhaust ports 33 and 34 respectively, the duct 26 leading into the cylinder, the rotary sleeve 24 arranged in said casing and having the openings 38 and 40, the stem or rod of said sleeve, a lever or arm 18 fixed on one or both ends of said rod, and a connecting rod or link arranged between the arms of the two valves, means being provided for throwing said link as described.

2. The combination in a rotary valve, of the cylindrical casing 25 having the necks 36 and the ports 33 and 34, a head 23 having the duct 26 of smaller diameter than the cylinder of the casing, a rod passing concentrically through said casing, means for rotating the stem, a rotary valve sleeve arranged in said cylinder and having the open end concentric with the duct 26, said sleeve provided with the openings 38 and 40 to be moved over the ports 34 and 33 respectively and said sleeve being fixed upon said stem to rotate therewith.

3. The combination in a rotary valve, of the casing 25 provided with the ports 33 and 34, and with the openings 37 in its side, of the head 23 provided with the duct 26, the shoulder 41 of said head, the head 30 and the shoulder 29 thereof, the valve sleeve 24 arranged in said cylinder and fitting between said shoulders, said sleeve having the open end and the ports 38 and 40 the valve stem passing through said sleeve and said heads, means for rotating said stem, said sleeve secured thereon and provided with the holes 28 in its end 27 whereby the sleeve is balanced, substantially as described.

In testimony whereof I have hereunto set my hand this 20th day of February, 1892.

JAMES H. BROWN.

In presence of—
C. B. DANIELS,
WM. BUSSELMAN.